(12) United States Patent
Schrenk et al.

(10) Patent No.: US 12,738,791 B2
(45) Date of Patent: Sep. 15, 2026

(54) ELECTRIC MACHINE WITH A CONNECTION RING ASSEMBLY, AND METHOD FOR CONNECTING A CONNECTION RING ASSEMBLY TO A CONDUCTOR ELEMENT

(71) Applicant: ZF FRIEDRICHSHAFEN AG, Friedrichshafen (DE)

(72) Inventors: Tobias Schrenk, Bad Neustadt an der Saale (DE); Sven Ludsteck, Münnerstadt (DE); Jürgen Tröster, Dittelbrunn (DE); Christian Benkert, Ebelsbach (DE); Georg Riemer, Schweinfurt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 201 days.

(21) Appl. No.: 18/697,531

(22) PCT Filed: Sep. 28, 2022

(86) PCT No.: PCT/EP2022/076914
§ 371 (c)(1),
(2) Date: Apr. 1, 2024

(87) PCT Pub. No.: WO2023/057268
PCT Pub. Date: Apr. 13, 2023

(65) Prior Publication Data

US 2024/0413694 A1 Dec. 12, 2024

(30) Foreign Application Priority Data

Oct. 4, 2021 (DE) .................... 10 2021 211 160.2

(51) Int. Cl.
*H02K 3/50* (2006.01)
*H02K 15/32* (2025.01)

(52) U.S. Cl.
CPC .............. *H02K 3/50* (2013.01); *H02K 15/32* (2025.01); *H02K 2203/09* (2013.01)

(58) Field of Classification Search
CPC ...... H02K 3/50; H02K 15/32; H02K 2203/09; H02K 3/28

(Continued)

(56) References Cited

U.S. PATENT DOCUMENTS 6,519,832 B1 * 2/2003 DeHart .................. H02K 15/26 29/33 F
2015/0256040 A1 9/2015 Creviston et al.
2020/0280232 A1 * 9/2020 Natsumeda ............ H02K 3/522

FOREIGN PATENT DOCUMENTS

CN 104852499 8/2015
CN 208782596 4/2019

(Continued)

OTHER PUBLICATIONS

Office Action of corresponding German Patent Application No. DE 10 2021 211 160.2.

*Primary Examiner* — Ahmed Elnakib
(74) *Attorney, Agent, or Firm* — COZEN O'CONNOR

(57) ABSTRACT

An electric machine with a stator which includes a stator winding system and a connection ring assembly. The connection ring assembly has at least one connection lug for connecting a conductor end section of a conductor element of the stator winding system, and the conductor end section contacts the connection lug. The connection lug has a clamping portion for establishing the contact with the conductor end section, and a fitting portion for producing a fitted connection between the connection lug and the conductor end section. The connection lug has a first width along the circumference of the connection ring assembly in the clamping portion, and a second width along the circumference of (Continued)

the connection ring assembly in the fitted portion, and the first width is smaller than the second width.

12 Claims, 4 Drawing Sheets

(58) Field of Classification Search
USPC ........................................................ 310/71
See application file for complete search history.

(56) References Cited

FOREIGN PATENT DOCUMENTS

| | | |
|---|---|---|
| CN | 212676986 | 3/2021 |
| DE | 10301441 | 11/2003 |
| DE | 102016119564 | 4/2017 |
| DE | 102018219539 | 5/2020 |
| DE | 102019200751 | 7/2020 |
| JP | 2020150753 | 9/2020 |

* cited by examiner

ELECTRIC MACHINE WITH A CONNECTION RING ASSEMBLY, AND METHOD FOR CONNECTING A CONNECTION RING ASSEMBLY TO A CONDUCTOR ELEMENT

CROSS REFERENCE TO RELATED APPLICATIONS

This is a U.S. national stage of Application No. PCT/EP2022/076914 filed Sep. 28, 2022. Priority is claimed on German Application No. DE 10 2021 211 160.2 filed Oct. 4, 2021, the content of which is incorporated herein by reference.

BACKGROUND OF THE INVENTION

1. Field of the Invention

The present disclosure relates to an electric machine having a connection ring assembly and to a method for connecting a connection ring assembly to at least one conductor element.

2. Description of the Related Art

Conventionally in electric machines, to connect a connection ring assembly of the stator to a conductor element, in particular the wire can be clamped to a straight connection lug. Here, edges of the connection lug can be parallel. As a result of a clamping jaw structure and a not ideally straight wire and such a straight connection lug, a gap or fitting gap can be produced, for example, at a joint, which can have a detrimental influence on a weld produced at the connection.

DE 103 01 441 A1 discloses a rotating electric machine which has a line element with a line strip section and an arm section integrated with the line strip section, which extends from a side end section of the line strip section almost parallel in a longitudinal direction.

SUMMARY OF THE INVENTION

Against this background, one aspect of the present invention creates an improved electric machine with a connection ring assembly and an improved method for connecting a connection ring assembly to at least one conductor element as claimed in the independent patent claims.

According to one aspect of the present invention, in particular a geometric configuration of a contacting interface between the connection ring assembly and the conductor element can be provided, which means the fitting gap can be avoided. For example, a clamping tool or clamping jaws can engage on a portion of the connection lug which has a lower width; a portion having a greater width of the connection lug or having a widening can produce spreading of the conductor element, as a result of which in particular an unambiguous contact without any fitting gap can be achieved in a fitting portion of the connection lug. In other words, for a connection ring assembly, a geometry of the connection lug with a widening to form a joint can be provided, in order that the wire is clamped against the thin region of the connection lug during the clamping and is spread out at the widening. As a result, a fitting gap at the contact point between wire and wiring can be eliminated or at least minimized. In other words, a fitting gap between a wire end and a connection lug of the connection ring assembly, effected by a clamping tool of the wire to the connection ring assembly, can be avoided. Thus, a subsequent welding process can be made easier. A fitting gap of 0 mm is ideal, wherein, according to embodiments, in particular it is possible to achieve a critical fitting gap of less than 0.1 mm.

The electric machine proposed with the one aspect of the present invention comprises a stator with a stator winding system and a connection ring assembly, wherein the connection ring assembly has at least one connection lug for the connection of a conductor end section of a conductor element of the stator winding system, wherein the conductor end section is in contact with the connection lug. The electric machine is characterized in that the connection lug has a clamping portion for producing the contact of the conductor end section and a fitting portion for producing a fitted connection between the connection lug and the conductor end section, wherein the connection lug has a first width along the circumference of the connection ring assembly in the clamping portion and a second width along the circumference of the connection ring assembly in the fitting portion, the first width being smaller than the second width.

Preferably, making the connection or producing the contact between the connection lug and conductor end section can be performed by a clamping tool, wherein the connection lug is arranged along a circumference of the connection ring assembly in a region between clamping jaws of the clamping tool, and wherein the clamping jaws are movable or displaceable relative to one another in order to clamp the conductor end sections in contact with the clamping portion of the connection lug.

The connection ring assembly can be molded so as to be substantially open in the manner of a hollow cylinder or closed with an outer circumference and with an axial vertical dimension. The connection lug can be arranged on or in the region of an outer circumferential surface of the connection ring assembly. By a first of the clamping jaws of the clamping tool, a first conductor end section can be clamped in contact with a first side of the connection lug. By a second of the clamping jaws of the clamping tool, a second conductor end section can be clamped in contact with a second side of the connection lug. The connection lug can be arranged in this case between the conductor end sections.

According to one aspect of the present invention, the second width can be larger by the factor 1.2 to 1.3 than the first width. For example, the second width can be larger by the factor 1.25 than the first width. Such an embodiment offers the advantage that, by suitable bending of the conductor end sections by the clamping jaws, gap-free contact of the conductor end sections can be achieved in the fitting portion of the connection lug.

In particular, the first width can be 4.0 mm and the second width can be 5.0 mm. Such an aspects offers the advantage that an advantageous width ratio can be implemented with the usual dimensions of the connection ring assembly and of the connection lug.

In addition, the connection lug can have a widening portion arranged between the clamping portion and the fitting portion. Here, a width of the connection lug along the circumference of the connection ring assembly in the widening portion can in particular increase continuously from the first width to the second width. The widening portion can have an equal-sided trapezoidal profile. Such an aspect of the present invention offers the advantage that particularly beneficial bending of the conductor end section or sections can be effected in order to reliably achieve gap-free contact of the conductor end section or sections in the fitting portion.

An axial height of the widening portion can be 3.0 mm. The height can extend along the axial vertical dimension of the connection ring assembly. Such an aspect of the present invention offers the advantage that the conductor end sections can be bent by the clamping jaws into secure contact against the connection lug in the fitting portion.

Furthermore, the connection ring assembly can have a plurality of connection lugs, which can be arranged to be distributed along the circumference of the connection ring assembly. Here, a plurality of conductor end sections of the at least one conductor element can be connectable or connected to the connection lugs.

The ends of the clamping portions of all the connection lugs that face the fitting portions can be arranged at one axial height on the circumference of the connection ring assembly. In addition, ends of the clamping jaws that face the fitting portions and the ends of the clamping portions that face the fitting portions can be arranged at the same axial height on the circumference of the connection ring assembly. The axial height on the circumference, more precisely the outer circumference of the connection ring assembly, can relate to the axial vertical dimension of the connection ring assembly. Such an aspect of the present invention offers the advantage that the conductor end sections can be connected simply, rapidly and securely to the connection ring assembly.

In addition, at least two of the connection lugs can have axial heights that differ from one another. Additionally or alternatively, at least two of the connection lugs can be arranged at different axial heights along the circumference of the connection ring assembly. Such an aspect of the present invention offers the advantage that different connection variants can be implemented with minimal outlay.

A method for connecting one embodiment of a connection ring assembly mentioned herein to at least one conductor element for an electric machine comprises the following steps:

- inserting a conductor end section between a respective adjacent clamping jaw and a connection lug; optionally additionally inserting a further conductor end section between a second clamping jaw and the connection lug;
- effecting a relative movement between the clamping jaws in order to clamp the conductor end section or the conductor end sections in contact with the connection lug; and
- making a fitted connection between the connection lug and the conductor end section or the conductor end sections in the fitting portion.

The connection method can advantageously be performed in association with an embodiment of a connection ring assembly mentioned herein.

According to one aspect of the present invention, at least the effecting step can be performed simultaneously for each connection lug. Thus, the existing conductor end sections can be clamped in contact with the respective connection lugs in a parallel, simultaneous or concurrent process. As a result, assembly time and assembly effort can be saved.

BRIEF DESCRIPTION OF THE DRAWINGS

The invention is explained in more detail by way of example with reference to the appended drawings, in which.

DETAILED DESCRIPTION OF THE PRESENTLY PREFERRED EMBODIMENTS

In the following description of preferred exemplary embodiments of the present invention, the same or similar designations are used for the elements illustrated in the various figures and acting similarly, a repeated description of these elements being omitted.

Figure 1:
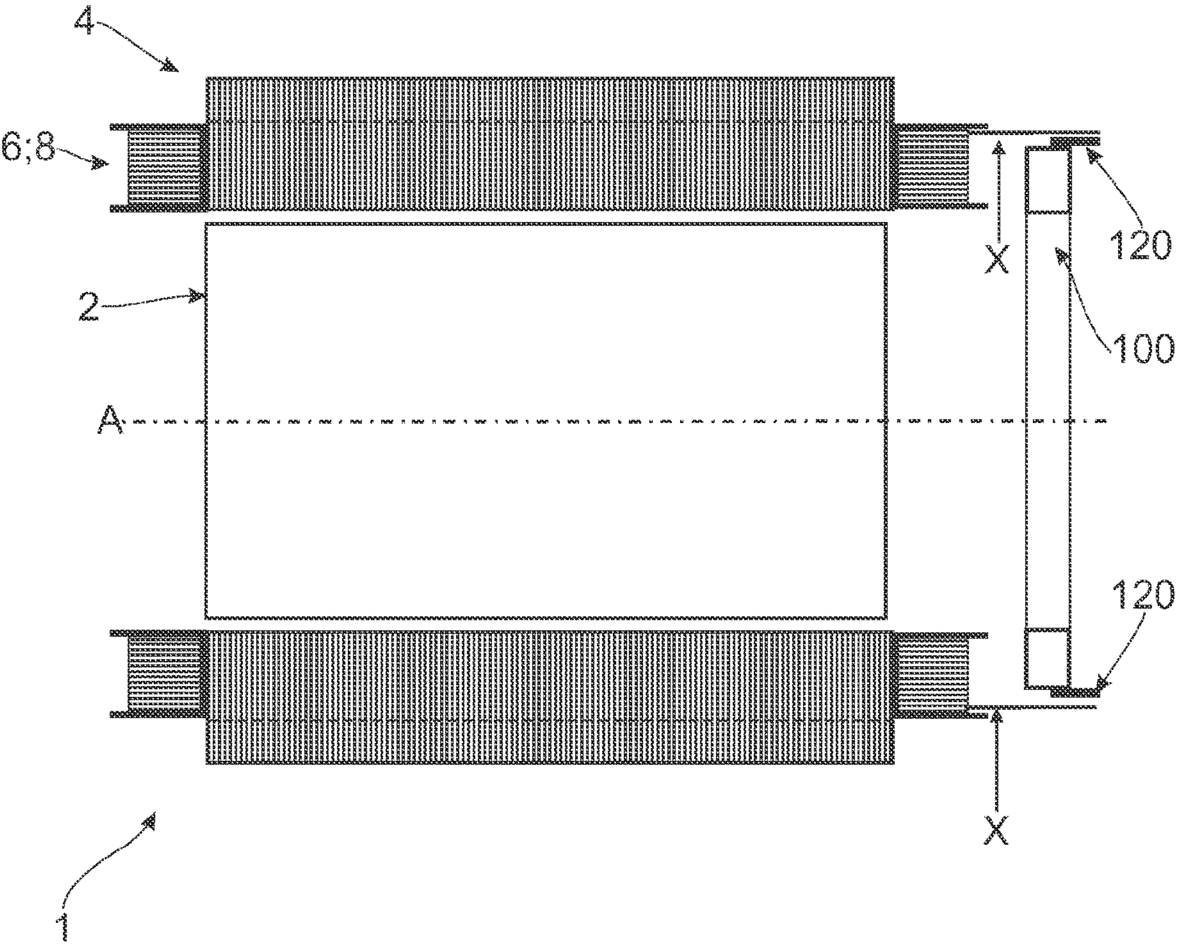
FIG. 1 is a schematic illustration of an electric machine comprising a stator and comprising a connection ring assembly.

FIG. 1 shows a preferably multi-phase electric machine 1 having a rotor 2 rotatable about a central axis A, and having a stator 4 arranged coaxially thereto and having a stator winding system 6 with a plurality of coils 8. The coils 8 are produced from a coil wire or generally from at least one conductor element and are electrically connected to a connection ring assembly 100 by their coil ends or conductor end sections X. The stator winding system can have, for example, a number of single-tooth windings or concentrated coils or a hairpin winding assembled from a large number of conductor elements. The connection ring assembly 100 comprises a plurality of connection rings made of an electrically conductive material, for example from copper, arranged or stacked axially in relation to the aforementioned central axis A in the present exemplary embodiment and electrically insulated from one another. The connection ring assembly 100 is used for the defined wiring of the coil ends of the coils 8, for example to form a star or delta circuit. In the present case, to form the connection ring assembly 100, the individual connection rings are then overmolded with a plastic, only connection lugs 120 of the connection rings projecting out of the composite component thus formed, being angled over axially and being ready to be connected to the coil ends. The connection is preferably formed integrally as a soldered or welded connection.

Figure 2:
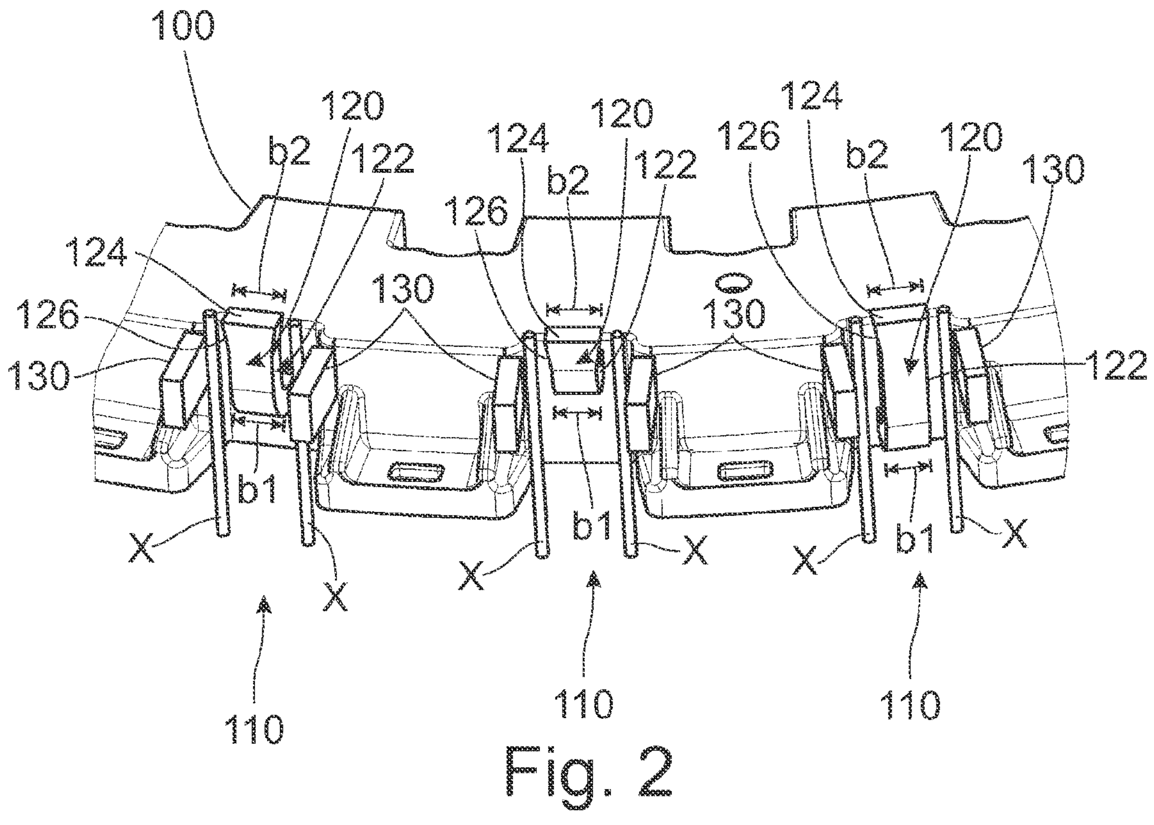
FIG. 2 is a connection ring assembly for an electric machine in an unclamped state.

FIG. 2 shows an exemplary embodiment of a connection ring assembly 100 for an electric machine 1 in an unclamped state. In the illustration of FIG. 2, only one portion of the connection ring assembly 1 is shown for reasons of space. The connection ring assembly 100 can be connected to at least one conductor element of the electric machine. Of the at least one conductor element, only a plurality of coil ends or conductor end sections X are shown in the illustration of FIG. 2. The conductor element can have a round cross-sectional shape, as illustrated in the figures, or any other desired cross-sectional shape such as, for example, a rectangular or square cross-sectional shape.

The connection ring assembly 100 comprises at least one connection lug 120. In the illustration of FIG. 2, three connection lugs 120 out of a plurality of connection lugs of the connection ring assembly 100 that are provided are shown merely by way of example. A connection lug 120 is assigned respectively two conductor end sections X, which, in the circumferential direction, are positioned adjacent to the connection lug 120. In the circumferential direction, on both sides of the connection lugs 120 and both sides of the conductor end sections X inserted there, in each case two clamping jaws 130 of a clamping tool, not shown in detail, are illustrated, which are thus not part of the wiring assembly itself. The connection lugs 120 are arranged along a circumference, more precisely an outer circumference, of the connection ring assembly 100, the clamping jaws 130 being in an open or unclamped state.

The clamping jaws 130 are designed to clamp the respectively illustrated two conductor end sections X in contact with the connection lug 120. To this end, the clamping jaws 130 are movable or displaceable relative to one another, more precisely toward one another, in order to bring the conductor end sections X into contact with the connection lug 120 or to clamp the latter. During the clamping, the two clamping jaws thus act as a supporting surface and a mating supporting surface.

In the exemplary embodiment, a first of the conductor end sections X is arranged between a first of the clamping jaws 130 and a first side of the connection lug 120, wherein a second of the conductor end sections X is arranged between a second of the clamping jaws 130 and a second side of the connection lug 120, facing away from the first side. In the illustration of FIG. 2, in which the connection ring assembly 100 is shown in the unclamped state, the clamping jaws 130 have been moved away from one another or apart, and the conductor end sections X are at a distance from the connection lug 120.

The connection lug 120 of each of the contact positions 110 is designed to connect two conductor end sections X of the at least one conductor element to the connection ring assembly 100 or to permit their connection. The connection lug 120 comprises a clamping portion 122 and a fitting portion 124. The clamping portion 122 can be clamped between the two clamping jaws 130. The fitting portion 124 is used to make a fitted connection between the connection lug 120 and the conductor end sections X. The fitting portion 124 is preferably provided on the free end face of the connection lugs 120. In the clamping portion 122, the connection lug 120 has a first width b1 along the circumference of the connection ring assembly 100. In the fitting portion 124, the connection lug 120 has a second width b2 along the circumference of the connection ring assembly 100. The first width b1 is smaller than the second width b2. For example, the second width b2 is greater by the factor 1.2 to 1.3 than the first width b1, in particular by the factor 1.25.

According to one aspect of the present invention, and as is shown by way of example in FIG. 2, each connection lug 120 also has a widening portion 126, which is arranged between the clamping portion 122 and the fitting portion 124. In the widening portion 126, a width of the connection lug 120, measured along the circumference of the connection ring assembly 100, increases continuously from the first width b1 to the second width b2. To this end, the widening portion 126 is molded with a, for example, equal-sided trapezoidal profile. In addition, each connection lug 120 has a transition point along each of two side edges of the same, wherein the width of the connection lug 120, measured along the circumference of the connection ring assembly 100, changes abruptly or continuously at the transition point. This transition point represents a boundary or a transition between the clamping portion 122 and the widening portion 126.

In particular, the connection ring assembly 100 comprises a plurality of contact positions 110, of which three contact positions 110 are illustrated merely by way of example in FIG. 2. The contact positions 110 are arranged to be distributed along the circumference of the connection ring assembly 100. Thus, a plurality of conductor end sections X of the at least one conductor element can be connected to the connection lugs 120 of the contact positions 110. As can also be seen with reference to FIG. 2, the clamping jaws 130 of all the contact positions 110 are arranged at a common axial height or at the same height on the outer circumference of the connection ring assembly 100. In addition, ends of the clamping portions 122 of the connection lugs 120 of the contact positions 110 that face the fitting portions 124 are arranged at a common axial height or at the same axial height on the outer circumference of the connection ring assembly 100. According to one exemplary embodiment, at least two of the connection lugs 120, at least three connection lugs 120 according to the exemplary embodiment illustrated here, have mutually different axial heights. Furthermore, the connection lugs have the same radial position with respect to the central axis of the machine.

Additionally or alternatively, at least two of the connection lugs 120, at least three connection lugs 120 according to the exemplary embodiment illustrated here, are arranged at different axial heights on the outer circumference of the connection ring assembly 100, as these correspond to the axial position of the associated connection rings.

Figure 3:
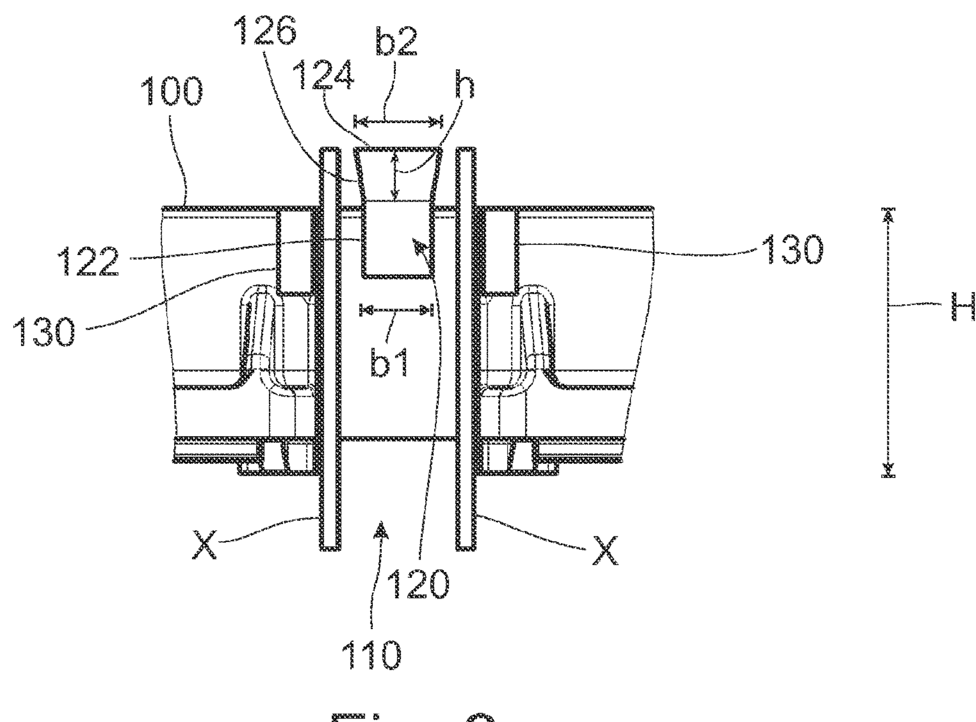
FIG. 3 is a detail of the connection ring assembly from FIG. 2.

FIG. 3 shows a detail of the connection ring assembly 100 from FIG. 2. In the detail shown in FIG. 3, one contact position 110 of the connection ring assembly 100 from FIG. 2 is illustrated, merely by way of example the contact position shown in the center in FIG. 2. In FIG. 3, in addition to FIG. 2, an axial height h of the widening portion 126 and an axial height dimension H of the connection ring assembly 100 are drawn in. The height h of the widening portion 126 extends along the height dimension H of the connection ring assembly 100. It can also be seen from FIG. 3 that the width of the connection lug 120 widens in the shape of a V toward the fitting portion 124.

According to one aspect of the present invention, the first width b1 or base width is, for example, 4.0 mm, and the second width b2 or the width of the connection lug 120 at the fitting portion 124 is, for example, 5.0 mm. Furthermore, the height h of the widening portion 126 is, for example, 3.0 mm.

Figure 4:
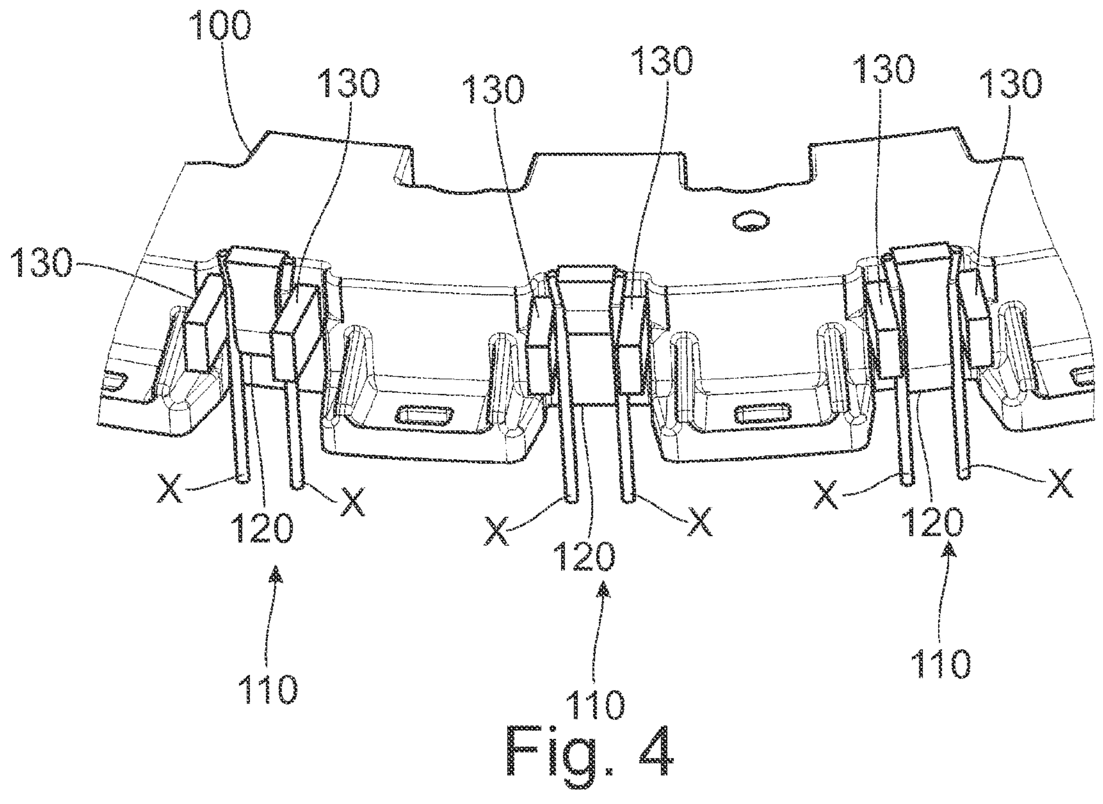
FIG. 4 is the connection ring assembly from FIG. 2 in a clamped state.

FIG. 4 shows the connection ring assembly 100 from FIG. 2 in a clamped state of the clamping tool. The illustration in FIG. 3 corresponds to the illustration from FIG. 2 with the exception that the connection ring assembly 100 is shown in the clamped state. In the clamped state, the conductor end sections X are clamped in contact with the connection lugs 120 by the clamping jaws 130. Here, as compared with the unclamped state from FIG. 2, the clamping jaws 130 of each contact position 110 have been moved or displaced toward each other or onto each other. As a result, the conductor end sections X are in contact with the connection lugs 120, more precisely in contact with the clamping portions 122, the widening portions 126 and the fitting portions 124.

Figure 5:
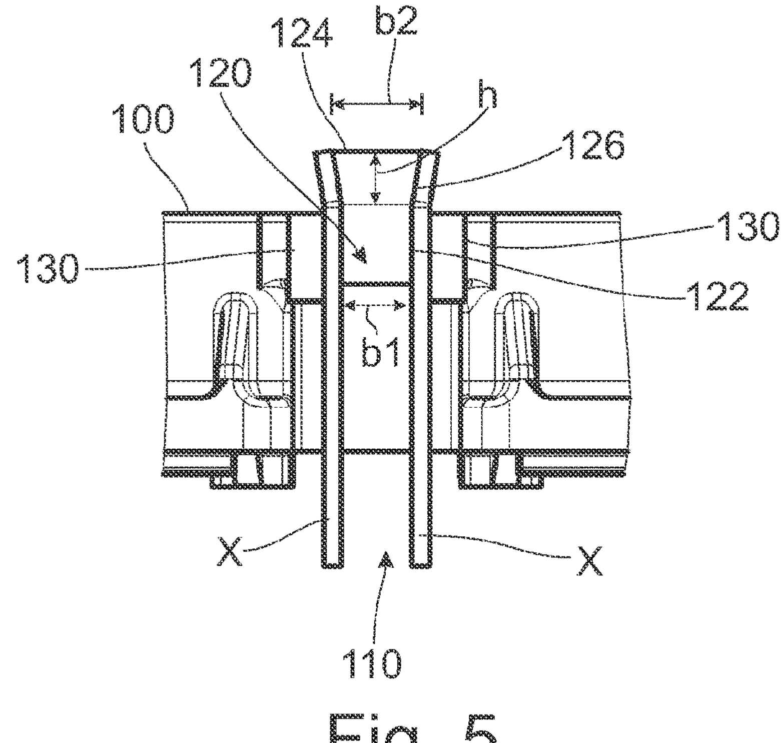
FIG. 5 is a detail of the connection ring assembly from FIG. 4.

FIG. 5 shows a detail of the connection ring assembly 100 from FIG. 4. In the detail shown in FIG. 5, a contact position 110 of the connection ring assembly 100 from FIG. 4 is illustrated, merely by way of example the contact position shown in the center in FIG. 4. In FIG. 5, in addition to FIG. 4, the height h of the widening portion 126 and the height dimension H of the connection ring assembly 100 are drawn in. It can also be clearly seen in FIG. 5 that the two conductor end sections X are in contact with the connection lug 120, more precisely in contact with the clamping portion 122, the widening portion 126 and the fitting portion 124. Because of the clamping action by the clamping jaws 130, the conductor end sections X bear continuously on the connection lug 120 on the sides of the connection lug 120 and are bent in a way corresponding to the contour of the connection lug 120.

Figure 6:
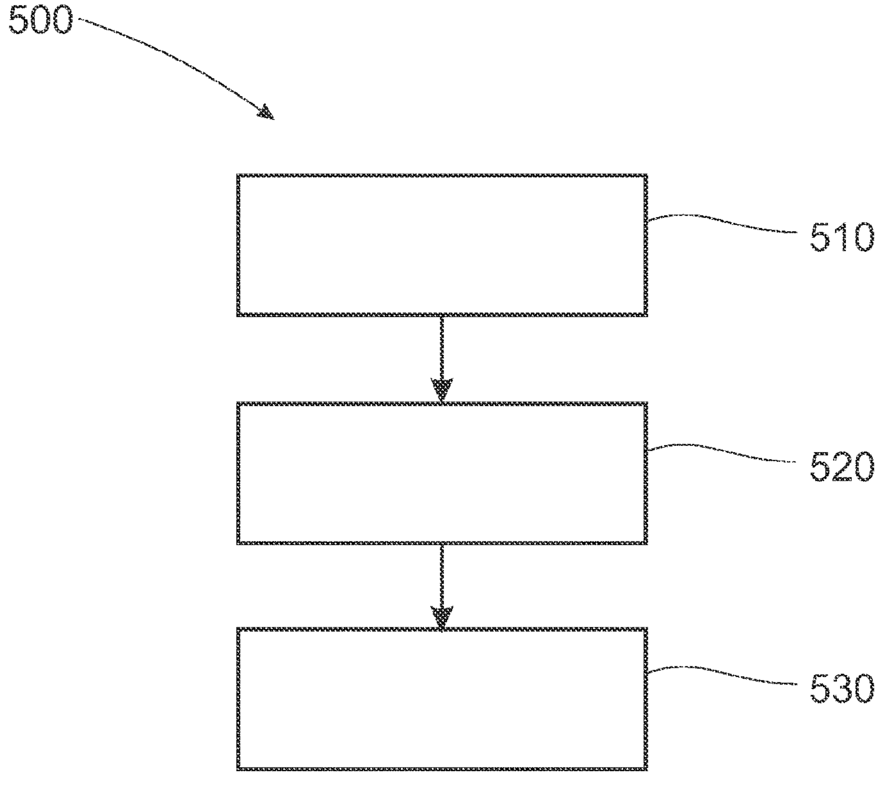
FIG. 6 is a flowchart of a method for connecting a connection ring assembly to at least one conductor element for an electric machine.

FIG. 6 shows a flowchart of an exemplary embodiment of a method 500 for connecting a connection ring assembly to at least one conductor element for an electric machine. The method 500 can be performed in order to connect the connection ring assembly from one of the figures described above or a similar connection ring assembly to at least one conductor element for an electric machine. Thus, the connection method 500 can be performed in association with the connection ring assembly from one of the figures described above or a similar connection ring assembly. The connection method 500 comprises an insertion step 510, an effecting step 520 and a making step 530.

In the insertion step 510, a conductor end section is inserted between a respective adjacent clamping jaw and the connection lug. Optionally, a further conductor end section (X) can additionally be inserted between a second clamping jaw and the connection lug.

Then, in the effecting step 520, a relative movement between the clamping jaws is effected in order to clamp the conductor end section or, if present, two conductor end sections in contact with the connection lug. Following in turn, in the making step 530, a fitting connection between the connection lug and the conductor end section or the conductor end sections is made in the fitting portion.

According to an exemplary embodiment wherein the connection ring assembly has a plurality of contact positions, at least the effecting step 520 is performed simultaneously for each contact position.

The exemplary embodiments described and shown in the figures have been chosen merely by way of example. Different exemplary embodiments can be combined with one another completely or with reference to individual features. In addition, an exemplary embodiment can be extended by features of a further exemplary embodiment.

Also, method steps according to one aspect of the invention can be performed repeatedly and in an order differing from that described.

If an exemplary embodiment comprises an "and/or" link between a first feature and a second feature, this can be read such that the exemplary embodiment according to one embodiment has both the first feature and the second feature and, according to a further embodiment, has only the first feature or only the second feature.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electric machine comprising:

a stator comprising:

a stator winding system and a connection ring assembly, having at least one connection lug for connection of a conductor end section of a conductor element of the stator winding system, wherein the conductor end section is in contact with the at least one connection lug, wherein the at least one connection lug has a clamping portion configured to produce the contact with the conductor end section and a fitting portion for making a fitted connection between the at least one connection lug and the conductor end section, wherein the at least one connection lug has a first width along a circumference of the connection ring assembly in the clamping portion, and a second width along the circumference of the connection ring assembly in the fitting portion, the first width being smaller than the second width.

2. The electric machine as claimed in claim 1, wherein the second width is greater by a factor of 1.2 to 1.3 than the first width.

3. The electric machine as claimed in claim 1, wherein the first width is 4.0 mm and the second width is 5.0 mm.

4. The electric machine as claimed in claim 1, wherein the at least one connection lug has a widening portion arranged between the clamping portion and the fitting portion, wherein a width of the at least one connection lug along the circumference of the connection ring assembly in the widening portion increases from the first width to the second width.

5. The electric machine as claimed in claim 4, wherein a height of the widening portion is 3.0 mm.

6. The electric machine as claimed in claim 4, wherein the width of the connection lug along the circumference of the connection ring assembly in the widening portion increases from the first width to the second width continuously.

7. The electric machine as claimed in claim 1, wherein the connection ring assembly has a plurality of contact positions, which are arranged to be distributed along the circumference of the connection ring assembly, wherein a plurality of conductor end sections is connected to respective connection lugs.

8. The electric machine as claimed in claim 7, wherein ends of the conductor end sections facing respective fitting portions of all the connection lugs are arranged at a same axial position on the circumference of the connection ring assembly.

9. The electric machine as claimed in claim 8, wherein at least two of the connection lugs have mutually different axial positions and/or at least two of the connection lugs are arranged at different axial positions along the circumference of the connection ring assembly.

10. The electric machine as claimed in claim 1, wherein the second width is greater by a factor of 1.25 than the first width.

11. A method for connecting a connection ring assembly of an electric machine to at least one conductor element of a stator winding system, wherein the method comprises:

using a clamping tool with two clamping jaws that can be displaced relative to each other at a contact position;

inserting a conductor end section between a first clamping jaw and a connection lug;

inserting a further conductor end section between a second clamping jaw and the connection lug;

effecting a relative movement between the two clamping jaws in order to clamp the conductor end section or the conductor end sections in contact with a clamping portion of the connection lug; and making a fitted connection between the connection lug and the conductor end section or the conductor end sections in the fitting portion, wherein the connection lug has a first width along a circumference of the connection ring assembly in the clamping portion, and a second width along the circumference of the connection ring assembly in the fitting portion, the first width being smaller than the second width.

12. The method as claimed in claim 11, wherein at least the effecting is performed simultaneously for each connection lug.

* * * * *